US 6,736,518 B1

(12) United States Patent
Belt et al.

(10) Patent No.: US 6,736,518 B1
(45) Date of Patent: May 18, 2004

(54) CUBE-CORNER REFLECTOR PERMITTING TIGHT BEAM SPACING AND MINIMAL WAVEFRONT DISTORTION IN A MULTI-AXIS INTERFEROMETER

(75) Inventors: R. Todd Belt, Mountain View, CA (US); John J. Bockman, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/390,119

(22) Filed: Mar. 14, 2003

(51) Int. Cl.$^7$ ................................................ G02B 5/122
(52) U.S. Cl. ........................ 359/529; 359/834; 359/850
(58) Field of Search ................................. 359/529, 834, 359/836, 850, 855–857, 861

(56) References Cited

U.S. PATENT DOCUMENTS 5,438,449 A * 8/1995 Chabot et al. ............. 359/216
5,459,316 A * 10/1995 Doyle .................... 250/339.11
6,050,691 A * 4/2000 Fellows et al. ............. 359/529

OTHER PUBLICATIONS

Bockman, John J., "Statement of Inventor Regarding Prior Sale", Mar. 14, 2003.

* cited by examiner

Primary Examiner—James Phan

(57) ABSTRACT

A cube corner reflector is oriented so that incident and reflected beams either entirely miss the edges at the intersections of reflective surfaces or so that the beams have only peripheral portions incident on the edges. A symmetry plane of the cube corner reflector is midway between the incident and reflected beams of the cube corner reflector and contains the central axis of the cube corner reflector and one of the edges between the reflective surfaces. For a minimum size reflector that permits the tight beam spacing, trimmed surfaces perpendicular to the symmetry plane are at different distances from the central axis. The edges, variations in the orthogonality of the reflective surfaces, and beam walk off cause less wavefront distortion that could affect measurements in systems such as interferometers.

12 Claims, 3 Drawing Sheets

CUBE-CORNER REFLECTOR PERMITTING TIGHT BEAM SPACING AND MINIMAL WAVEFRONT DISTORTION IN A MULTI-AXIS INTERFEROMETER

BACKGROUND

Cube corner reflectors are well-known optical elements that are used in a variety of optical systems. A cube corner reflector 100 as illustrated in FIG. 1 has three planar reflective surfaces 110, 120, and 130 that intersect at right angles in the same manner as the intersection of faces at the corner of a cube. Reflective surfaces 110, 120, and 130 can be formed on three sides of a tetrahedral glass block that also has a transparent face 140 for input of an incident beam and output of a reflected beam. The tetrahedral glass block in cube corner reflector 100 is symmetric so that the perimeter of transparent face 140 forms an equilateral triangle and the perimeters of reflective surfaces 110, 120, and 130 are congruent isosceles right triangles.

Cube-corner reflector 100 is a retroreflector, and therefore a reflected beam from cube-corner reflector 100 is parallel to but offset from an incident beam regardless of the direction of the incident beam. FIG. 1 illustrates an example of an incident beam 180 that enters cube corner reflector 100 through transparent face 140 and reflects from one or more of reflective faces 110, 120, and 130 before exiting as a reflected beam 190. Reflected beam 190 is parallel to incident beam 180 and offset from incident beam 180 by twice the perpendicular separation between incident beam 180 and a vertex 150 of cube corner reflector 100.

The tetrahedral shape of cube corner reflector 100 includes more glass than is generally required for the optical function of cube corner reflector 100, particularly in optical systems where the location and direction of the incident beam is well controlled. Cube corner reflector 100 can thus be trimmed to remove glass that is not required for the optical function of cube corner reflector 100. One conventional way to trim cube corner reflector 100 is to take a cylindrical core of cube corner reflector 100, which results in transparent face 140 having a circular perimeter. Another known trimming scheme gives transparent face 140 a rectangular boundary 145.

FIG. 2 shows a cube corner reflector 200 resulting from trimming cube corner 100 at boundary 145. Cube corner reflector 200 is small for a retroreflector capable of reflecting an incident beam 280 to provide an offset reflected beam 290. The minimum required size of cube corner reflector 200 to perform this optical function depends on the desired offset between incident and reflected beams 280 and 290, the diameters or areas of beams 180 and 290, and the path of the beams inside cube corner reflector 200. To minimize the area of the face of cube corner reflector 200, incident beam 280 (or alternatively reflected beam 290) is centered at a point on an edge 235 of cube corner reflector 200.

Analysis of the beam paths in cube corner reflector 200 shows the if incident beam 280 is parallel to a central axis of cube corner reflector 200 then the beam paths will remain within a band having boundaries at the upper and lower edges of beams 280 and 290 in FIG. 2. For example, a ray 282 at a top edge of incident beam 280 reflects from a reflective face 210 toward a reflective face 230 and then reflects from a point on reflective face 230 that is at the same height as the bottom edge of incident beam 280. From there, the ray travels horizontally to reflective surface 220 and exits as a reflected ray 292 at the bottom of reflected beam 290. Similarly, a ray 284 at the bottom of incident beam 280 reflects from reflective surface 230 to a point on reflective surface 210 at the same height as the top of incident beam 280, travels horizontally to the top of reflected beam 290, and exits as reflected ray 294. The height of cube corner reflector 200 can thus be as small as the diameter of beams 280 and 290 plus an added margin for beam variations or misalignments.

FIG. 3 illustrates a known multi-axis plane mirror interferometer 300 employing four cube corner reflectors 200. U.S. Pat. No. 09/876,531, entitled "Multi-Axis Interferometer With Integrated Optical Structure And Method For Manufacturing Rhomboid Assemblies" further describes some examples of multi-axis interferometers containing retroreflectors that can be implemented using cube corner reflectors.

Interferometer 300 has four input beams IN1 to IN4 that are direction into a polarizing beam splitter 310. Polarizing beam splitter 310 splits input beams IN1 to IN4 into components according to polarization. Components of one polarization from input beams IN1 to IN4 become respective measurement beams M1 to M4, and components of an orthogonal polarization in input beams IN1 to IN4 become reference beams (not shown). Measurement beams M1 to M4 travel from polarizing beam splitter 310 to a planar measurement reflector (not shown) that is mounted on an object being measured. The measurement reflector returns measurement beams M1 to M4 along the same paths.

Polarization changing elements (e.g., quarter-wave plates) 320 are in the paths of outgoing and returning measurement beams M1 to M4 and change the polarization of measurement beams M1 to M4 so that polarization beam splitter 310 directs the returning measurement beams M1 to M4 to respective cube corner reflectors 200.

Cube corner reflectors 200 reflect returning measurement beams M1 to M4 so that offset measurement beam M1' to M4' can traverse polarizing beam splitter 310 and elements 320, reflect from the measurement reflector, and return through elements 320 and polarizing beam splitter 310 to form parts of respective output beams OUT1 to OUT4. Each measurement axis of interferometer 300 corresponds to a pair of beams M1 to M1', M2 and M2', M3 and M3', or M4 and M4' and to a measured point that is halfway between the centers of the incident areas of the corresponding pair on the measurement mirror. Accordingly, cube corner reflectors 200 must be small enough to fit within the spacing of measurement beams M1 to M4 and M1' to M4' that is required for the desired measurement axes.

The reference beams have paths that include first reflections from a reference reflector (not shown), reflections from respective cube corner reflectors 200, and second reflections from the reference reflector before the reference beams rejoin respective measurement beams M1' to M4' in output beams OUT1 to OUT4. The two reflections of each measurement beam from the measurement reflector, the two reflections of each reference beam from the reference reflector, and the intervening reflections from the associated cube corner reflector 200 are well known to eliminate an angular separation that misalignment of the measurement or reference mirror might otherwise cause between the reference and measurement beams in the combined output beam.

A measurement along a measurement axis of interferometer 300 requires measuring and analyzing the phases of the measurement and reference beams that are within the output beam associated with the measurement axis. These measurements are most accurate if the wavefronts of measurement and reference beams are uniform because the measured phase information is generally an integral or average of the phase information over a cross-section of the output beam. Further, the integrated/analyzed portion of the measurement beam typically changes because of beam "walk-off". Beam walk-off occurs when the object being measured changes angular orientation. The walk-off changes the matched portions of the measurement and reference beams, causing an erroneous phase shift when the beam wavefront is nonuniform. Wavefront distortion can thus cause errors and lower signal-to-noise ratios in phase information measurements and correspondingly in the measurements along the measurement axes of interferometer 300.

Returning to FIG. 2, edge 235 of cube corner reflector 200 passes through the center of incident beam 280. The reflection of a beam from edge 235 is generally nonuniform and distorts the wavefront of the reflected beam. Such non-uniformity may arise from a chamber formed to improve the safety or durability of an otherwise sharp edge and from roll off that commonly arises at the edges of polished optical surfaces. This wavefront distortion can be significant for an interferometer measurement particularly because wavefront distortion from the edge crosses through the center of the beam where light intensity is high.

Another source of wavefront distortion in cube corner reflector 200 arises from reflective surfaces 210, 220, and 230 not being perfectly orthogonal. When incident beam 280 is incident on edge 235, the angular errors in the orientations of reflective surfaces 210, 220, and 230 cause the wavefront (i.e., the surface of uniform phase) of output beam 290 to be V-shaped. This V-shape produces measurement errors when measuring a phase for a planar cross-section of the beam. Correcting for this type of wavefront distortion is difficult because expected beam movement relative to edge 235 typically changes which side of the V-shaped wavefront corresponds to the larger portion of beam intensity.

In view of the limitations of current cube corner reflectors, methods and structures that reduce the wavefront distortion caused in reflections from cube corner reflectors could improve measurement signal strength and the accuracy of interferometer measurements.

SUMMARY

In accordance with an aspect of the invention, a cube corner reflector is oriented so that incident and reflected beams either entirely miss the edges at the intersections of reflective surfaces or so that the beams have only peripheral portions incident on the edges. The edges thus cause less wavefront distortion that could affect measurements in systems such as interferometers. With one such orientation, a symmetry plane that is midway between the incident and reflected beams of the cube corner reflector contains one of the edges of the reflective surfaces and a central axis that passes through the vertex of the cube corner reflector. A cube corner reflector having trimmed surfaces perpendicular to its symmetry plane can be closely spaced with other cube corner reflectors to provide a tight beam pattern in a multi-beam device. For minimum size, the trimmed surfaces that are perpendicular to the symmetry plane are at different distances from the central axis.

One specific embodiment of the invention is an optical element such as a cube corner reflector. The optical element has three orthogonal reflective surfaces with three edges at the intersections of the reflective surfaces. A first edge is at an intersection of the first reflective surface and the second reflective surface and is symmetrically located between an incident beam and a reflected beam of the optical element. A second edge is at an intersection of the second reflective surface and the third reflective surface, and a third edge is at an intersection of the third reflective surface and the first reflective surface. A first trimmed surface is parallel to a central plane that contains central rays of the incident and reflected beam.

The optical element may further have a second trimmed surface that is parallel to the first trimmed surface, but the parallel trimmed surfaces are asymmetrically located relative to the central axis through the vertex of the optical element. A perpendicular distance between the first trimmed surface and the central plane differs from a perpendicular distance between the second trimmed surface and the central plane. More specifically, a perpendicular distance between one trimmed surface and the central plane may be required to extend beyond a radius of the incident and reflected beam by at least a distance corresponding to a non-zero deflection of incident beam toward the trimmed surface in the optical element. The beam is deflected away from the other trimmed surface in the optical element so that the distance between that trimmed surface and the central plane can be about equal to the radius of the beams.

Another specific embodiment of the invention is a cube corner reflector. The cube corner reflector includes first, second, and third reflective surfaces, an input/output face, and at least one trimmed surface. The input/output face is perpendicular to a central axis through the vertex of the cube corner reflector and includes a first transparent aperture for an incident beam and a second transparent aperture for a reflected beam. One trimmed face intersects a first edge that is between the first and second reflective surfaces, with the first edge being in a plane that also includes the central axis of the cube corner reflector and passes midway between the first and second apertures.

A second trimmed surface is parallel to the first trimmed surface and is such that a second edge that is between the second and third reflective surfaces makes an angle with the second trimmed surface that is equal to the angle made with the second trimmed surface by a third edge that is between the third and first reflective surfaces. A perpendicular distance between the first trimmed surface and the central axis of the cube corner reflector can be less than a perpendicular distance between the second trimmed surface and the central axis of the cube corner reflector.

BRIEF DESCRIPTION OF THE DRAWINGS

Use of the same reference symbols in different figures indicates similar or identical items.

DETAILED DESCRIPTION

Figure 4A:
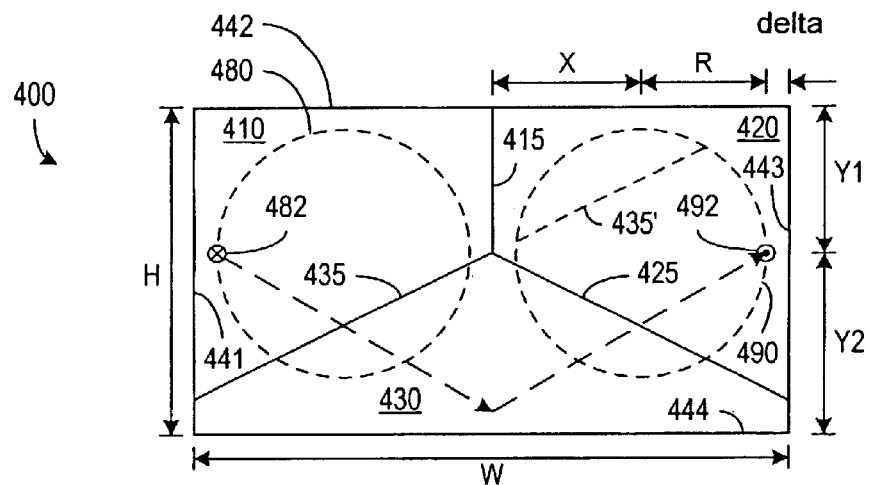
FIGS. 4A, 4B, and 4C are respectively a face-on view, a perspective view, and a side view of a trimmed cube corner reflector in accordance with an embodiment of the invention.
Figure 4B:
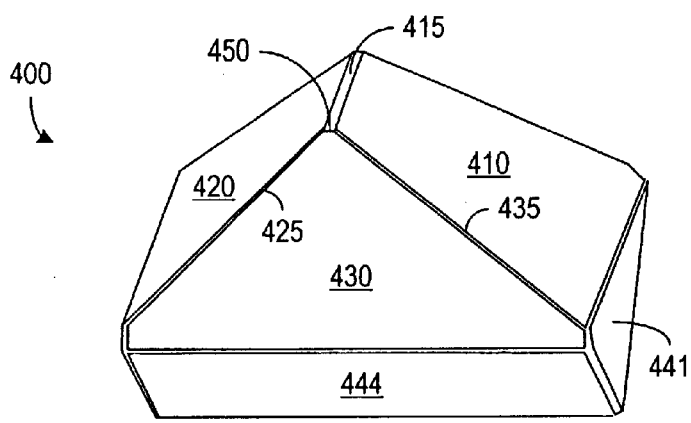
Figure 4C:
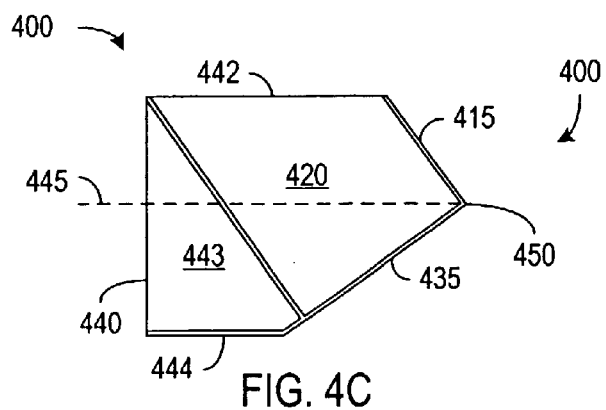

In accordance with an aspect of the invention, trimmed cube corner reflectors that permit tight beam spacing provide minimal distortion of the wavefronts of reflected beams. FIGS. 4A, 4B, and 4C respectively show a face-on view, a perspective view, and a side view of a cube corner reflector 400 in accordance with an embodiment of the invention. Cube corner reflector 400 includes a block of optical quality glass such as BK-7 glass that has three orthogonal reflective surfaces 410, 420, and 430 and an input/output face 440. With the illustrated trimming, reflective surfaces 410 and 420 have the same shape and size, while the shape and size of reflective surface 430 differs from those of reflective surfaces 410 and 420. Reflective surfaces 410, 420, and 430 can be formed using conventional techniques for formation of reflective metal coatings or multi-layer highly reflective dielectric coatings.

Edges 415, 425, and 435 between reflective surfaces 410, 420, and 430 meet at a vertex 450 through which a central axis 445 of cube corner 400 passes at equal angles to edges 415, 425, and 435. As illustrated in FIGS. 4B and 4C, affordable manufacturing normally does not permit edges 415, 425, and 435 to be perfectly sharp, and a sharp edge may be undesirable because of safety and durability concerns. The edges for a precision optical system such as an interferometer thus typically have a chamber about 0.2 mm or smaller when the edge may be in the beam path. A chamfer can be relatively large when the edge is away from the beam path.

Figure 1:
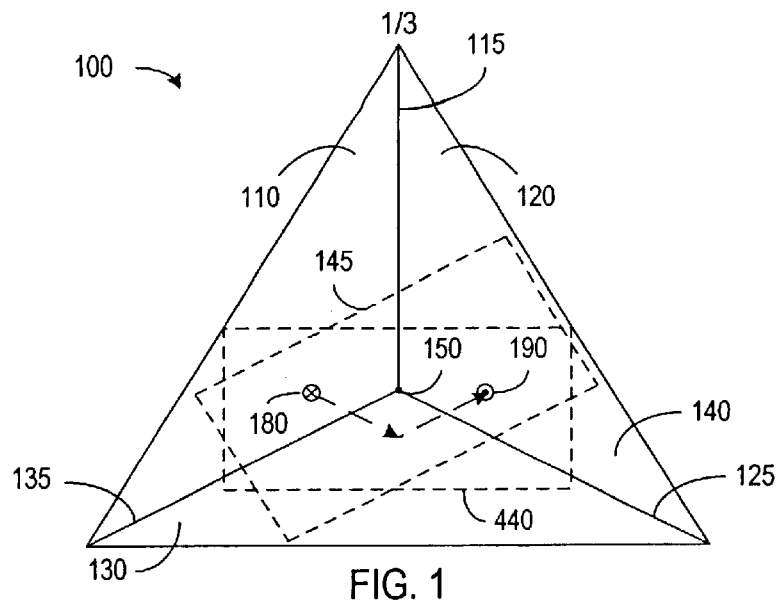
FIG. 1 shows a view through the face of a cube corner reflector having a tetrahedral glass body.

Input/output face 440 receives an incident beam 480 and returns a reflected beam 490 that is offset from and parallel to incident beam 480. (The roles of incident and reflected beams 480 and 490 are reversible, but beam 480 is presumed to be incident beam here for illustration.) Input/output face 440 has transparent apertures that correspond to incident beam 480 and reflected beam 490, but these apertures may merely be undistinguished areas of input/output face 440 when input/output face 440 is transparent across its entire area. FIG. 1 shows the orientation of input/output face 440 relative to a tetrahedral cube corner 100.

In addition to optical surfaces 410, 420, 430, and 440, cube corner 400 also has four trimmed surfaces 441, 442, 443, and 444 that bound input/output face 440. Trimmed surfaces 441 to 444 can be surfaces that remain after trimming processes cut an originally larger glass block. However, trimmed surfaces are more generally not functional optical surfaces and may be original surfaces that existed before cutting, grinding, and/or polishing processes formed the optical quality surfaces such as reflective surfaces 410, 420, and 430 and/or input/output face 440 of cube corner reflector 400.

Trimmed surfaces 441 to 444 generally can be planar or curved provided that trimmed surfaces 441 to 444 do not cut off any optically required portion of reflective surfaces 410, 420, and 430 or of input/output face 440. Trimmed surfaces 441 to 444, in a preferred embodiment, are shown as a set of respectively orthogonal and parallel surfaces that are orthogonal to input/output face 440. Trimmed surfaces 441 to 444 when planar act as convenient part datums for machining and/or other mechanical manufacturing processes.

Cube corner reflector 400 is specifically designed for incident beam 480 to be parallel to and centered a distance X from central axis 445 of cube corner reflector 400. As a result, the beam path within cube corner 440 is set, and the geometry of cube corner reflector 400, which controls the location of trimmed faces 441 to 444, can minimize the size of cube corner 400 for a particular selection of beam size and desired offset. In FIG. 4A, beams 480 and 490 have a radius R and offset X from vertex 450 of cube corner reflector 400.

Edges 415, 425, and 435 are oriented so that a symmetry plane containing edge 415 and central axis 445 of cube corner reflector 400 lies midway between beams 480 and 490. A perpendicular plane containing the centers of beams 480 and 490 and central axis 445 is above edges 435 and 425, causing incident beam 480 have a larger portion that initially reflects from surface 410 and a smaller portion that initially reflects from surface 430. The portion of beam 480 that is incident on edge 435 between reflective surfaces 430 and 410 is at an outer part of beam 480. Edge 435 thus affects a portion of beam 480 that is shorter than the diameter of beam 280. In comparison, edge 235 of conventional cube corner reflector 200 passes through a diameter of beam 280. Edge 435 of cube corner reflector 400 thus affects a smaller portion of incident beam 480, and for a beam having a Gaussian intensity distribution, edge 435 affects a smaller portion of the integrated power of incident beam 480. Edge 425 similarly affects the same small, low-intensity portion of the beam at the reflection that produces reflected beam 490.

The radius R of the clear apertures that accommodate beams 480 and 490 and variations in beams 480 and 490, a spacing δ between the clear aperture and the optical edge for glass edge imperfections, the desired offset 2X between the centers of beams 480 and 490, and the beam path in cube corner 400 control the minimum size of cube corner 400 and particularly control the locations or bounds of trimmed surface 441 to 444. In the direction of the offset, the distance from central axis 445 to trimmed surface 441 or 443 of cube corner reflector 400 must accommodate the separation X between central axis 445 and the center of the beam, a radius R, and spacing δ. Equation 1 thus indicates a minimum width W for cube corner reflector 400.

$$W=2(X+R+\delta) \qquad \text{Equation 1}$$

Central axis 445 and the centers of beams 480 and 490 are closer to trimmed surface 442 than to trimmed surface 444 because of the beam path within cube corner reflector. Reflective surface 410 reflects incident beam 480 toward reflective surface 430 and trimmed surface 444 and away from trimmed surface 442. Accordingly, a distance Y1 of trimmed surface 442 from the plane of central axis 445 and the central rays of beams 480 and 490 must accommodate the size of the beam (radius R) and spacing δ. The minimum distance Y1 is given in Equation 2.

$$Y1=R+\delta \qquad \text{Equation 2}$$

A distance Y2 of trimmed surface 444 from the plane of the central axis and central rays of beams 480 and 490 must accommodate the beam's size and movement of the beam toward trimmed surface 444 while still avoiding edge imperfections. FIG. 4A illustrates a ray 482 that is at outer edge (i.e., closest to trimmed surface 441) of beam 480 to illustrate the furthest extent of the beam path toward trimmed surface 444. Surface 410 reflects ray 482 towards reflective surfaces 430 and 420. The ray 482 reflected from surface 410 strikes surface 430 at a point below the profile of incident beam 480 as viewed in FIG. 4A. To avoid unacceptable power loss from the beam, distance Y2 must be large enough to avoid trimming away any of the reflection points of the beam from reflective surface 430. A geometrical analysis of cube corner reflector 400 indicates that Equation 3 will give the minimum distance Y2 in terms of separation X, radius R, and spacing δ.

$$Y2 = (X+R)\tan 30° + \delta \qquad \text{Equation 3}$$

One exemplary embodiment of the invention that provides an offset of 13 mm for an incident beam having a clear aperture diameter of 9 mm with a 2-mm radial allowance for edge imperfections has a total width of about 26 mm. Minimum distance Y1 is 6.5 mm, and minimum distance Y2 is about 8.35 mm in this embodiment.

When compared to prior trimmed cube corner reflectors, cube corner reflector 400 causes wavefront distortions that have a smaller effect on interferometer measurements because edges 425 and 435 reflect a small portion of the beam and that small portion has low light intensity.

Figure 2:
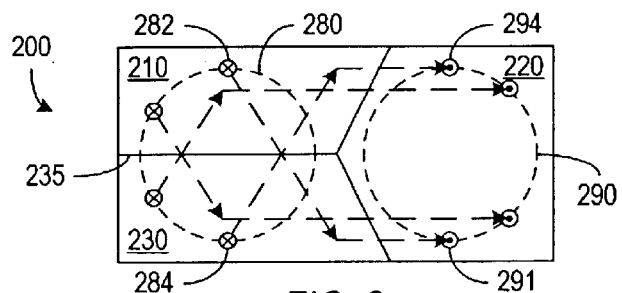
FIG. 2 shows a view through the face of a known cube corner reflector having a glass body that is trimmed to provide a rectangular face.

Trimmed cube corner reflector 400 provides better performance, and particularly less wavefront distortion, than does the conventional trimmed cube corner reflector 200 (FIG. 2) when manufactured with comparable imperfections (e.g., non-orthogonal reflective surfaces, edge roll-off, and chamfer.). In particular, in FIG. 4A, edge 425 and a reflection 435' of edge 435 split the area of reflected beam 490 into three parts. If reflective surfaces 410, 420, and 430 are not perfectly orthogonal, each of these parts of reflected beam 490 has uniform phase in a different plane. However, most of the beam intensity is in the central part of reflected beam 490, even when normal beam movement is taken into account.

Figure 5:
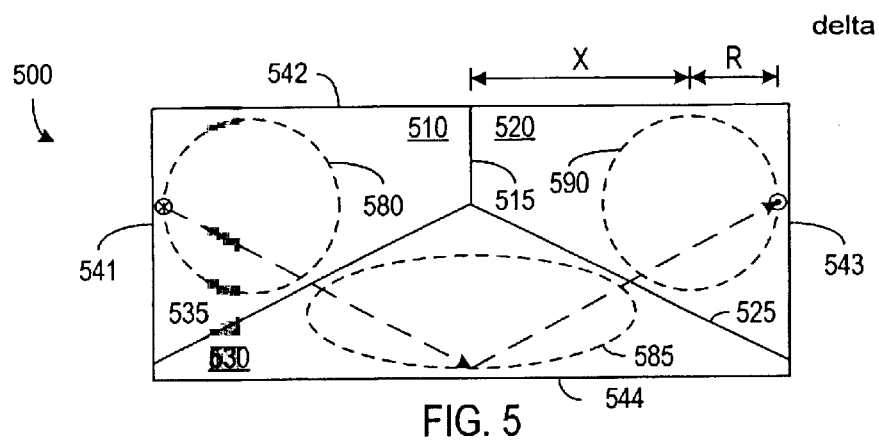
FIG. 5 is a view through the face of a trimmed cube corner reflector in accordance with another embodiment of the invention.

The amount or significance of both these types of wavefront distortion depends on the ratio of the beam size to the desired offset. If the desired offset is large relative to the beam diameter, reflection from edges 425 and 435 and the associated wavefront distortions can be completely avoided. FIG. 5, for example, shows a cube corner reflector 500 in which the ratio of the off-axis distance X to the radius R is large enough to avoid reflections from edges 515, 525, and 535 between the reflective surfaces 510, 520, and 530. In cube corner reflector 500, an incident beam 580 is entirely incident on reflective surface 510. Beam 580 reflects from surface 510 onto an area 585 of reflective surface 530. The beam then reflects from area 585 onto reflective surface 520 to form output reflected beam 590. The minimum size of cube corner reflector 500 and particularly the minimum distances between trimmed surfaces 541, 542, 543, and 544 and the central axis of cube corner 500 depend on off-axis beam displacement X, the radius R, the spacing δ for beam variations, and the beam path as described above.

Figure 3:
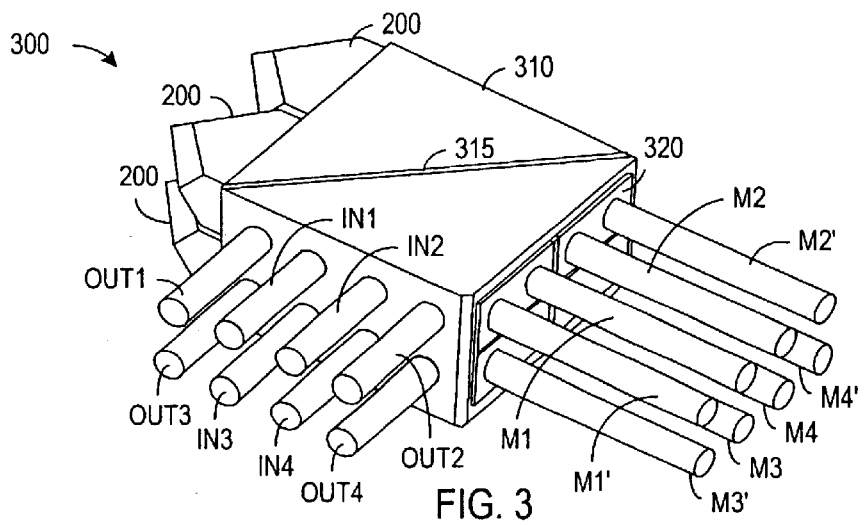
FIG. 3 is a perspective view of a known multi-axis interferometer having a tight beam spacing, which requires uses of trimmed cube corner reflectors.
Figure 6:
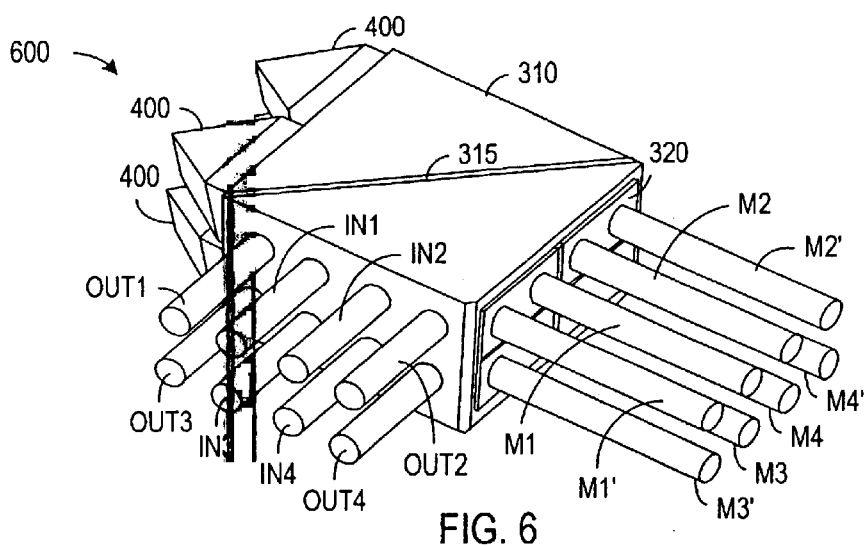
FIG. 6 is a perspective view of a multi-axis interferometer employing cube corner reflectors that are trimmed in accordance with an embodiment of the invention.

FIG. 6 illustrates multi-axis interferometer optics 600 including multiple cube corner reflectors 400 for respective measurement axes. Interferometer 600 has four input beams IN1 to IN4 that are directed into a polarizing beam splitter 310. As described above in regard to interferometer 300 of FIG. 3. Polarizing beam splitter 310 splits input beams IN1 to IN4 according to polarization into measurement beams M1 to M4 and reference beams (not shown). Measurement beams M1 to M4 travel from polarizing beam splitter 310 to a planar measurement reflector (not shown) that is mounted on an object being measured. The measurement reflector returns measurement beams M1 to M4, which pass through polarizing beam splitter 310 and enter respective cube corner reflectors 400. From cube corner reflectors 400, offset measurement beams M1' to M4' follow paths to reflect a second time from the measurement reflector before polarizing beams splitter 310 directs returning offset measurement beams M1' to M4' to form parts of output beams OUT1 to OUT4, respectively. The reference beams have paths that similarly include first reflections from a reference reflector (not shown), reflections from respective cube corner reflectors 400, and second reflections from the reference reflector before the reference beams rejoin respective measurement beams M1' to M4' to form output beams OUT1 to OUT4.

The horizontal and vertical spacing of cube corner reflectors 400 match the spacing of measurement beams M1 to M4 or M1' to M4'. Overall system requirements generally dictate this beam spacing, which is required to perform measurements along the desired axes. The trimming of cube corner reflectors 400 allows arrangement of cube corner reflectors 400 in an array that achieves tight beam spacing. When compared to the minimum size of conventional trimmed cube corner reflectors 200, trimmed cube corner reflectors 400 are generally somewhat larger in the direction perpendicular to the beam offset because the distance Y2 to one trimmed surface accommodates an internal beam path that departs from the band containing incident and reflected beams. However, cube corner reflectors at the edge of beam arrays can be oriented with distance Y2 directed out of the beam array, so that the increased size has no effect on beam spacing. In larger arrays (i.e., arrays having three or more cube corner reflectors along the direction perpendicular to the reflection offsets), the increased size is typically acceptable for the required interferometer beam pattern. Thus, for little or no increase in the beam spacing, cube corner reflectors 400 provide less wavefront distortion than do conventional trimmed cube corner reflectors. Analysis of phase information from the beams after reflections from respective cube corner reflectors 400 can thus provide a higher signal-to-noise ratio and more accurate interferometer measurements.

Figure 7:
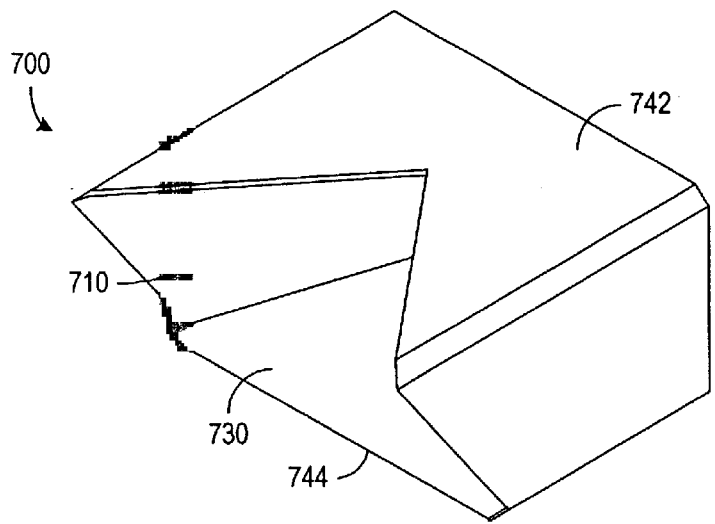
FIG. 7 is a perspective view of a trimmed, hollow cube corner reflector in accordance with an embodiment of the invention.

A hollow cube corner reflector in which the paths of the incident and reflected beams are within a hollow portion, rather than within a glass block, can also be trimmed to provide a small size and little or no wavefront distortion. FIG. 7, for example, is a perspective view of a hollow cube corner reflector 700 in accordance with an embodiment of the invention. Cube corner reflector 700 includes orthogonal reflective planar surfaces 710, 730, and a surface not shown in the view of FIG. 7. Reflective planar surfaces 710 and 730 and the reflective surface not illustrate correspond to and have substantially the same shapes as reflective surfaces 410, 430, and 420 of cube corner reflector 400 or reflective surfaces 510, 530, and 520 of cube corner reflector 500, so that a front view of cube corner reflector 700 has substantially that same appearance as illustrated in FIG. 4A or FIG. 5.

Cube corner reflector 700 has a trimmed surface 742 that intersects symmetric reflective surface 710 and the reflective surface (not shown) that is symmetric with reflective surface 710. Another trimmed surface 744 intersects reflective surface 730. In accordance with an aspect of the invention, the distance between trimmed surface 742 and the center plane of cube corner reflector 700 can be less than the distance between the center plane and trimmed surface 744 (where trimmed surface 744 intersects reflective surface 730.) The respective distances can, for example, be as given in Equations 1 and 2. The reduction in the distance between trimmed surface 742 and the center plane allows use of cube corner reflector 700 in systems where the beam spacing does not permit the used of a symmetrically trimmed cube corner reflector.

Although the invention has been described with reference to particular embodiments, the description is only an example of the invention's application and should not be taken as a limitation. In particular, although exemplary embodiments of the invention include cube corner reflectors that are separate optical functions of cube corner reflectors can be integrated into optical elements that also perform other optical functions. Various other adaptations and combinations of features of the embodiments disclosed are within the scope of the invention as defined by the following claims.

What is claimed is:

1. An optical element comprising:
   a first reflective surface;
   a second reflective surface;
   a third reflective surface;
   a first edge at an intersection of the first reflective surface and the second reflective surface, the first edge being symmetrically located between an incident beam and a reflected beam of the optical element;
   a second edge at an intersection of the second reflective surface and the third reflective surface;
   a third edge at an intersection of the third reflective surface and the first reflective surface, wherein the first, second, and third edges all meet at a vertex and;
   a first trimmed surface intersects the first and the second reflective surfaces and is parallel to a central plane containing central rays of the incident and reflected beam; and
   a second trimmed surface that intersects the third reflective surface along a trimmed edge that is parallel to the first trimmed surface, wherein
   a perpendicular distance between the first trimmed surface and the central plane is less than a distance between the trimmed edge and the central plane.

2. The optical element of claim 1, wherein the perpendicular distance between the first trimmed surface and the central plane is about equal to a radius of the incident beam.

3. The optical element of claim 1, wherein the distance between the trimmed edge and the central plane is about equal to a product of the tangent of 30° and a sum of a radius of the incident beam and a separation between the central ray of the incident beam and the vortex.

4. The optical element of claim 1, wherein the first edge is perpendicular to a line connecting centers of the incident beam and the reflected beam.

5. The optical element of claim 1, wherein the distance between the trimmed edge an the central plane extends beyond a radius of the incident and reflected beam by at least a distance corresponding to a non-zero deflection of incident beam toward the second trimmed surface in the optical element.

6. The optical element of claim 1, wherein paths of the incident and reflected beams are within a hollow portion of the optical element.

7. The optical element of claim 1, wherein the first, second, and third reflective surfaces are on a block containing paths of the incident and reflected beams.

8. A cube corner reflector comprising:
   first, second, and third reflective surfaces;
   an input/output face that is perpendicular to a central axis of the cube corner reflector, the input/output face including a first transparent aperture for an incident beam and a second transparent aperture for a reflected beam;
   a first trimmed surface that intersects a first edge that is between the first and second reflective surfaces, wherein the first edge is in a plane that includes the central axis of the cube corner reflector and passes midway between the first and second apertures; and
   a second trimmed surface that intersects the third reflective surface along a trimmed edge that is parallel to the first trimmed surface, wherein
   a perpendicular distance between the first trimmed surface and the central axis of the cube corner reflector is less than a perpendicular distance between the trimmed edge and the central axis of the cube corner reflector.

9. The reflector of claim 8, wherein the perpendicular distance between the first trimmed surface and the central axis is about equal to a radius of the incident beam.

10. The reflector of claim 8, wherein the perpendicular distance between the trimmed edge and the central axis is about equal to a product of the tangent of 30° and a sum of a radius of the incident beam and a separation between the central ray of the incident beam and the central axis.

11. The reflector of claim 8, wherein paths of the incident and reflected beams are within a hollow portion of the optical element.

12. The reflector of claim 8, wherein the first, second, and third reflective surfaces are on a block containing paths of the incident and reflected beams.

* * * * *